United States Patent [19]
Boster et al.

[11] Patent Number: 6,021,562
[45] Date of Patent: *Feb. 8, 2000

[54] FASTENER INSERTION MODULE FOR PROGRESSIVE DIE

[75] Inventors: Thomas C. Boster, Oakdale, Calif.; Boyce B. Barwick, Aypen, N.C.

[73] Assignee: Haeger, Inc., Oakdale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/707,342

[22] Filed: Sep. 3, 1996

[51] Int. Cl.[7] .................................................. B23P 19/04
[52] U.S. Cl. .............................. 29/798; 29/818; 227/142
[58] Field of Search ............................. 29/798, 816, 818; 227/142, 146, 130

[56] References Cited

U.S. PATENT DOCUMENTS

| | | | |
|---|---|---|---|
| 2,285,384 | 6/1942 | Schott | 227/142 X |
| 3,063,421 | 11/1962 | Fisher | 227/142 X |
| 3,268,993 | 8/1966 | Conner | 29/816 |
| 3,452,418 | 7/1969 | Ernest et al. | 29/818 |
| 3,528,157 | 9/1970 | McGee | 29/818 X |
| 3,718,965 | 3/1973 | Steward | 29/818 X |
| 3,746,235 | 7/1973 | Crabtree, Jr. | 227/142 X |
| 3,810,290 | 5/1974 | Grube | 29/816 X |
| 3,971,116 | 7/1976 | Goodsmith et al. | 29/798 |
| 4,208,776 | 6/1980 | Schleicher | 29/798 X |
| 4,765,057 | 8/1988 | Muller | 29/798 X |
| 4,785,529 | 11/1988 | Pamer et al. | 29/798 X |
| 5,566,446 | 10/1996 | Luckhardt et al. | 29/798 |

*Primary Examiner*—Joseph M. Gorski
*Attorney, Agent, or Firm*—Mark D. Miller

[57] ABSTRACT

A new tooling for use in a progressive die machine for the installation of self-clinching fasteners onto a sheet of material is provided. It is a complete tool easily mounted into the die during its construction and easily removed for service. Its compact size provides a minimal space between working stations on the die, and its height and stroke are minimized so as not to interfere with other operations on the die. It may be easily configured to allow for insertion of fasteners from either the top or the bottom, and is capable of correctly providing a fastener for insertion upon every cycle of the press. This is accomplished by use of a special bisected bushing which securely holds and positions each fastener in place prior to and during insertion. A replaceable force-limiting material is incorporated in the tooling above the anvil in order not to disrupt the progressive die press should fasteners or materials of excessive thickness be encountered. The force-limiting material has a pre-selected durometer, and acts as a slightly deformable pressure transmission element in the event an unexpectedly thick fastener or metal sheet (or both) is encountered. In such a case, the material absorbs the excess pressure so that the fastener is properly inserted without damager or destruction of the fastener, the part, the tooling, or the die. Different materials having an appropriately different durometer may be employed depending upon the characteristics of the fasteners and sheeting being used.

8 Claims, 4 Drawing Sheets

FASTENER INSERTION MODULE FOR PROGRESSIVE DIE

BACKGROUND OF THE INVENTION

1. Field of the Invention

The present invention relates to stamping presses, and more particularly to a fastener insertion module for inserting a self-clinching fastener into a part being formed on a progressive die within a stamping press.

2. Description of the Prior Art

Known to the steel part stamping industry is the technology of producing parts on a progressive die which is placed within a stamping press. A continuous strip of deformable steel or other material is fed in to the press from which identical parts are to be made. As a given section of the strip passes through the die, it is progressively worked (punched, sheared, formed, etc.) at individual stations so that by the time it reaches the end of the die, it has been formed into a completed part. The completed parts are then sheared off of the strip at the end of the die.

Often, the design of a given part requires that it include one or more self-clinching fasteners or nuts. For example, in the automotive industry, many components of various kinds are attached to metal plates or panels. Self-clinching fasteners are used to attach such parts as, for example, lamps and sheet metal to the vehicle. When such parts are attached, screws or bolts on the part itself are inserted into the threaded hole of the fastener or nut to hold the part in place.

Specialized fasteners known as pierce nuts are commonly used in progressive die stamping presses. A pierce nut first "pierces" the metal strip using a pilot portion on the nut, and then as pressure is applied, it is deformably attached to the strip. A pierce nut requires its own specialized installation tooling that is tailored for use in attaching the given nut known as a die button. A different die button is required for every different pierce nut, and such tooling can be quite elaborate (see, e.g., U.S. Pat. Nos. 5,174,018 and 5,502,888).

Self-clinching fasteners or nuts, as contrasted to pierce nuts, are attached as part of a two-step process. The first step is the punching of the desired hole in the metal part, and the second step is the insertion of the fastener. Historically, the insertion step has been performed on a machine other than the machine which forms the part. The insertion requires a close alignment of the fastener to the punched hole. Insertion forces vary per fastener size, material thickness and composition, but run generally in the range of 2 to 15 tons per fastener.

A progressive die in a stamping press may perform from two to twenty steps during each cycle, and may cycle 30 to 60 times every minute. The total pressure exerted by such presses can easily exceed 500 tons. With so much pressure present, a problem with any one of the many stations of the progressive die may cause an unexpected deformity in the strip passing through the press, and result in damage to the strip, or potentially damage to or destruction of the tooling and the die. Because these dangers are presented by the variables of different fastener sizes, and different material thicknesses and composition, insertion of self-clinching fasteners has not generally been performed on progressive die machines in the past. It is therefore desirable to provide the stamping press with the ability to insert the fastener concurrently with the process of forming the part. Thus, when the part is sheared off at the end of the die, the part is complete.

In addition to the above, the following U.S. patents are also known to exist:

| U.S. Pat. No. | Issue Date | Inventor |
| --- | --- | --- |
| 2,325,929 | August 3, 1943 | Amesbury |
| 4,803,767 | February 14, 1989 | Obrecht |
| 4,905,362 | March 6, 1990 | Obrecht |
| 5,174,018 | December 29, 1992 | Muller |
| 5,189,780 | March 2, 1993 | Landes |
| 5,502,888 | April 2, 1996 | Takahashi |

SUMMARY OF THE INVENTION

The present invention provides new tooling for use in a progressive die machine for the installation of self-clinching fasteners onto a sheet of material. It is a complete tool designed to be easily mounted into the die during its construction. It may be easily removed for service, and then placed back in the die. It is compact in size such that its width provides a minimal space between working stations on the die, and its height and stroke are minimized so as not to interfere with other operations on the die. The tooling can be easily configured to allow for insertion of fasteners from either the top or the bottom, so that it may be attached to either the upper or lower platen of the press for insertion of fasteners onto the top or bottom of the metal sheet.

The tooling is capable of providing a fastener for insertion upon every cycle of the press. This is accomplished by use of an external feed unit which separates and orients the fasteners. The fasteners are delivered to the tooling along a plastic feed tube using pneumatic pressure. At the rear of the tooling is a receptacle which accepts the feed tube allowing the fasteners unimpeded travel onto a track inside the tooling. Once on track, a spring-loaded stop prevents the fasteners from traveling backward along the track.

During each cycle of the press, a slidable cam having a pawl attached to it is moved back and forth. As the press retracts from full compression, the cam slides forward delivering the next fastener into position for insertion. Then, as the press cycles down again, the cam retracts allowing the spring-loaded pawl to pick up another fastener for delivery upon the next retraction. A cylindrical spring-loaded bisected bushing (or nest) in the tooling receives each fastener immediately prior to insertion. The upper end of this nest is in the form of an open armchair for laterally receiving a fastener from the pawl. The lower end of the nest forms a complete cylinder through which the fastener is moved vertically during the compression stroke of the press. The nest is bisected into two halves which are urged together using biasing springs. The diameter of the fastener is slightly larger than the inside diameter of the nest. The introduction of a fastener into the nest causes the bisected halves to move slightly apart thereby securely holding and positioning the fastener in place prior to and during insertion.

An important feature of the tooling is its ability to correctly insert a fastener each time. Each self-clinching fastener has a recommended force value that is to be used for proper insertion of the fastener into a given material. If this recommended force is not achieved while pressing in the fastener, the fastener will not be able to produce its specified performance. This performance includes its ability to resist torque and resist pushing loads. If this recommended force is exceeded, damage may occur to the part or the fastener, and potentially to the tooling and the die.

The anvil of the present tooling is adjustable so that the insertion height may be fine tuned during set-up of the die.

Due to variations in the thickness of the fastener or the sheet of material, proper anvil height and travel alone may not insure proper insertion of the fastener. Different fasteners may have a variance of between 5 and 15 thousandths of an inch, and the material into which the fastener is inserted may have variations of up to 5 thousandths of an inch. Thus, a total range of as much as 20 thousandths of an inch may occur at any given time. In order not to disrupt the progressive die press (which is providing potentially hundreds of tons of force during each cycle), and to avoid deforming the fastener or stripping its threads, a force limiting material is incorporated in the tooling above the anvil.

Above the anvil, a special urethane polymer material is provided which allows transfer of the compression of the press to the anvil. The replaceable material has a preselected durometer, and acts as a cushion in the event an unexpectedly thick fastener or metal sheet (or both) is encountered. In such a case, the material absorbs the excess pressure so that the fastener is properly inserted without damage or destruction of the fastener, the part, the tooling, or the die. Depending upon the durometer selected, the material may encounter tens of thousands of such situations before being replaced. A material having an appropriate durometer should be used depending upon the characteristics of the fasteners and sheeting being used.

It is therefore a primary object of the present invention to provide tool for inserting self-clinching fasteners into a part being formed on a progressive die within a stamping press.

It is a further important object of the present invention to provide a tool for inserting self-clinching fasteners into a part being formed on a progressive die within a stamping press which is capable of correctly inserting a fastener during each cycle of a stamping press.

It is a further important object of the present invention to provide a tool for inserting self-clinching fasteners into a part being formed on a progressive die within a stamping press which properly orients a fastener for each cycle of a stamping press.

It is a further important object of the present invention to provide a tool for inserting self-clinching fasteners into a part being formed on a progressive die within a stamping press which is capable of compensating for variations in the thickness of fasteners and sheeting material thereby assuring proper insertion of a fastener during each cycle of a stamping press.

It is a another object of the present invention to provide a tool for inserting self-clinching fasteners into a part being formed on a progressive die within a stamping press which may be easily installed, removed and serviced.

It is a another object of the present invention to provide a tool for inserting self-clinching fasteners into a part being formed on a progressive die within a stamping press which may be easily attached to an external feed unit for separation and orientation of the fasteners prior to delivery to the tool.

It is a another object of the present invention to provide a tool for inserting self-clinching fasteners into a part being formed on a progressive die within a stamping press which may be used on either the upper or lower platen of the progressive die for insertion of fasteners into the top or bottom of a sheet moving through the die.

It is another object of the invention to provide a tool for inserting self-clinching fasteners into a part being formed on a progressive die within a stamping press which is compact in size such that its width provides a minimal space between working stations on the die, and its height and stroke are minimized so as not to interfere with other operations on the die.

Other objects of the invention will be apparent from the detailed descriptions and the claims herein.

DETAILED DESCRIPTION OF THE DRAWINGS

Figure 9:
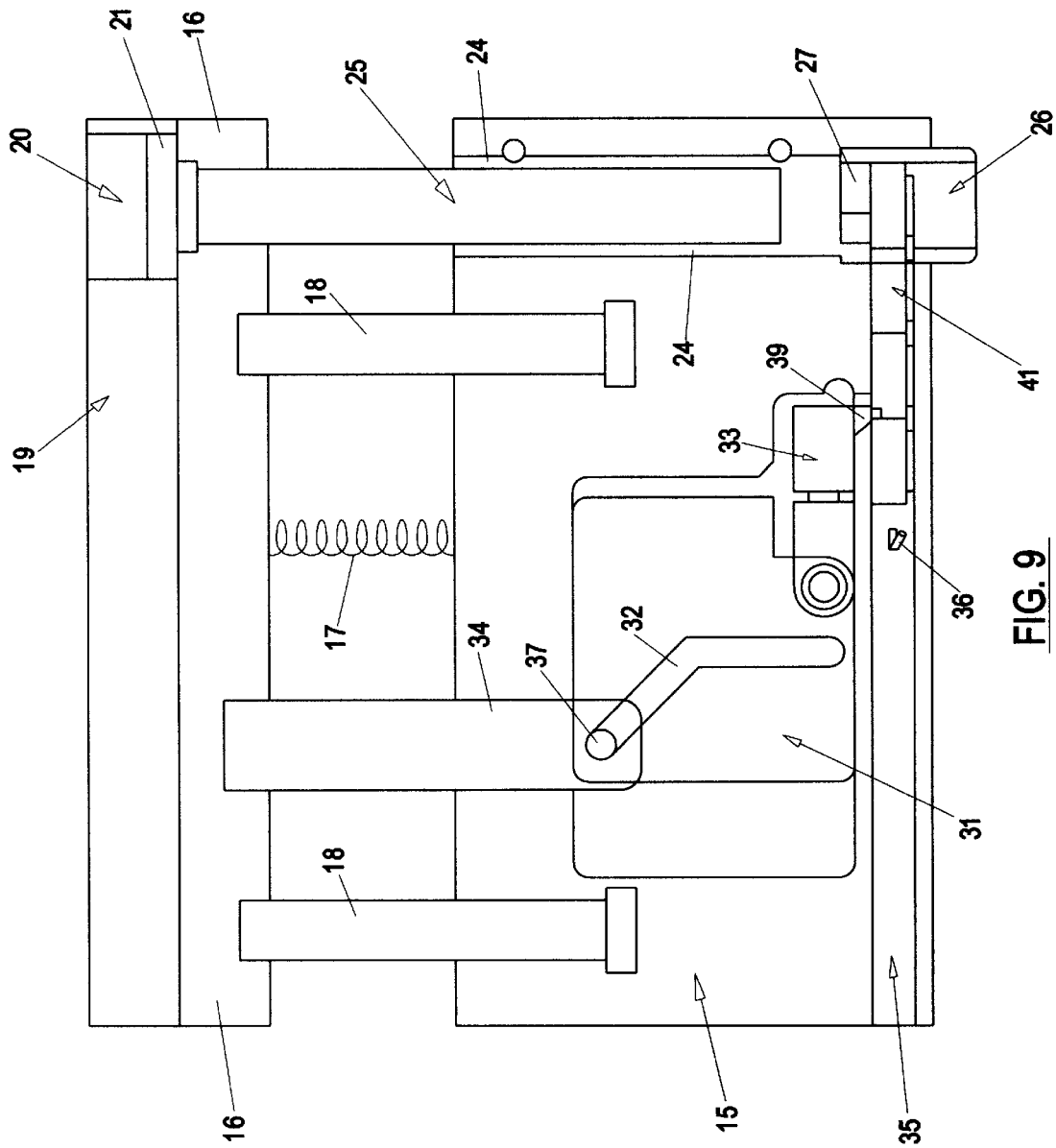
FIG. 9 is an enlarged view of FIG. 1 showing the tooling of the present invention in a fully retracted position.
Figure 10:
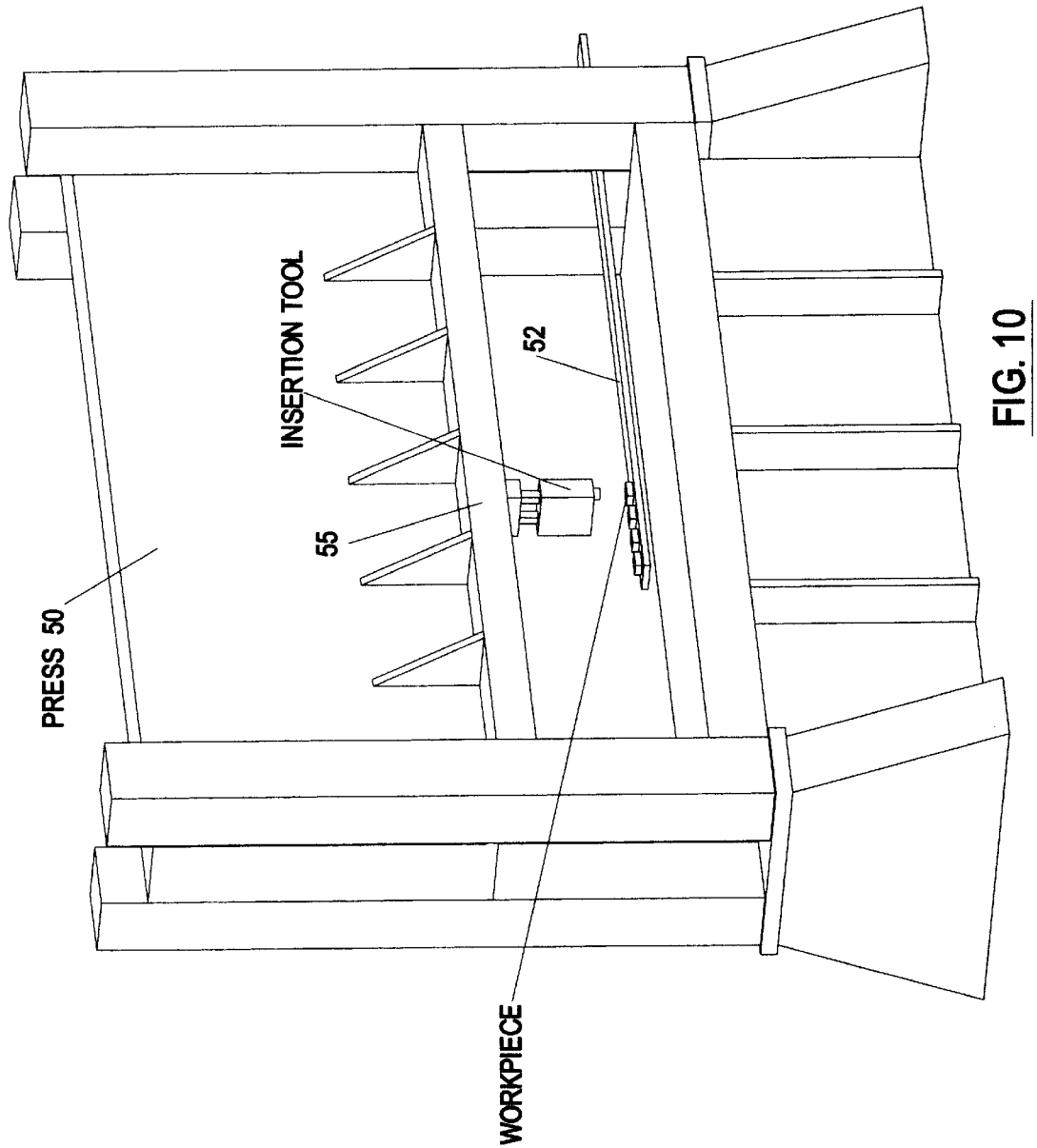
FIG. 10 is a perspective view of a stamping press showing only the tool of the present invention attached to the upper platen of a progressive die.

Referring to the drawings wherein like reference characters designate like or corresponding parts throughout the several views, and referring particularly to FIG. 9, it is seen that the invention includes a main tool body 15 slidably attached to an upper body 16 by a plurality of guides 18. Main body 15 is urged away from upper body 16 by one or more springs 17. Upper body 16 includes a housing 19 for the removable force limiting material 20 which is provided above a removable anvil 25 and between anvil 25 and the upper platen 55 of stamping press 50 (see FIG. 10). A force distribution washer 21 is provided immediately between anvil 25 and material 20.

Figure 8:
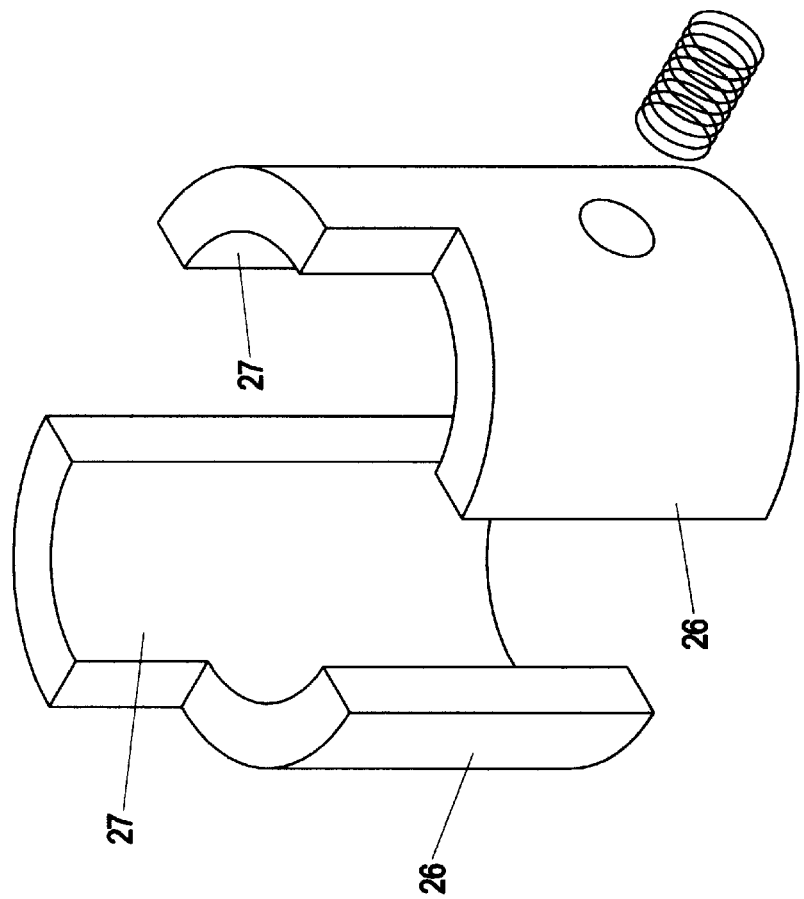
FIG. 8 is a partially exploded perspective view of the bushing or nest of the present invention.
Figure 7:
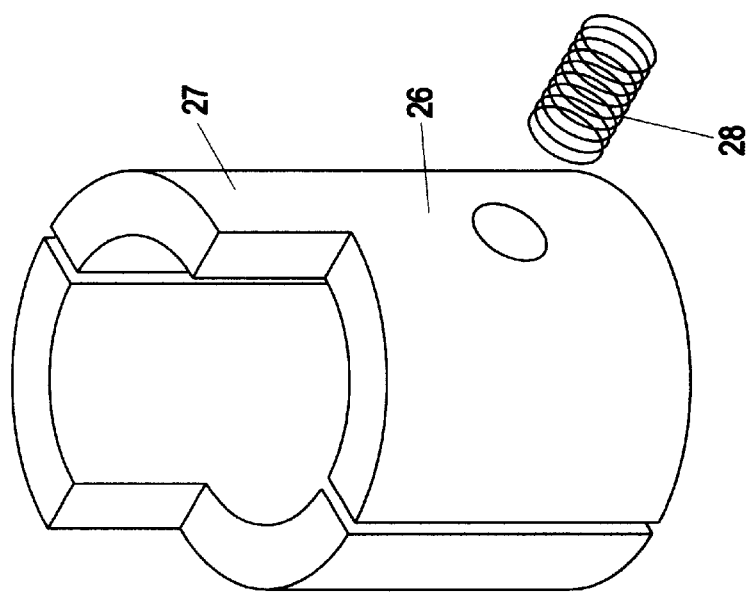
FIG. 7 is a perspective view of the bushing or nest of the present invention, showing placement of a biasing spring on one side.

Main body 15 is provided with a vertical shaft 24 for receiving anvil 25. A removable cylindrical bushing or nest 26 is provided below shaft 24. The inside diameter of nest 26 is larger than the outside diameter of anvil 25. Nest 26 is bisected into two halves as shown in FIGS. 7 and 8. The two halves are urged together by biasing springs 28 located on either side of nest 26. The top of nest 26 is partially cut away at 27 to allow lateral receipt of a fastener. Different sizes of nest 26 may be used, as dictated by the size of the fasteners being inserted.

Returning to FIG. 1, it is seen that main body 15 also includes a track 35 along which properly-oriented fasteners 41 are introduced. These fasteners are separated and oriented in an external device, and delivered to the end of track 35 opposite anvil 25. As the fasteners travel into track 35, a spring-loaded or deformable tang 36 prevents them from sliding backward.

A slidable cam 31 having an angled guide slot 32 is also provided inside body 15 just above track 35. A push rod 34 is attached to upper body 16. A cam follower 37 attached to push rod 34 follows slot 32 in cam 31. As cam 31 slides back and forth, pawl 33 moves along track 35. When cam 31 retracts away from anvil 25 during the down stroke of the press, the spring loaded arm 39 of pawl 33 moves back until it gets behind a fastener 44 on track 35. The spring of arm 39 then pops down so that arm 39 may then urge all fasteners in front of it toward nest 26 below anvil 25.

Figure 2:
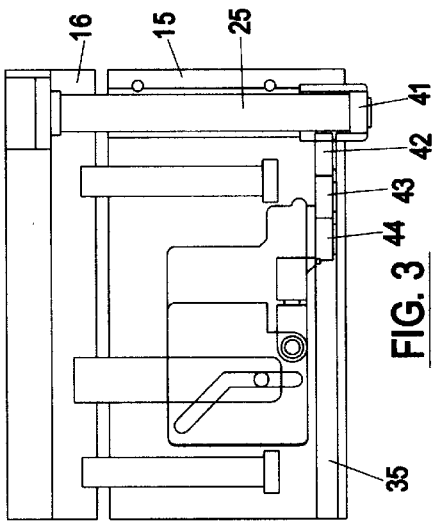
FIG. 2 is a diagrammatic side view of the tooling of the present invention attached to a press which is mid way through a down stroke, showing the anvil in contact with the fastener to be inserted and the simultaneous pick up of another fastener.
Figure 1:
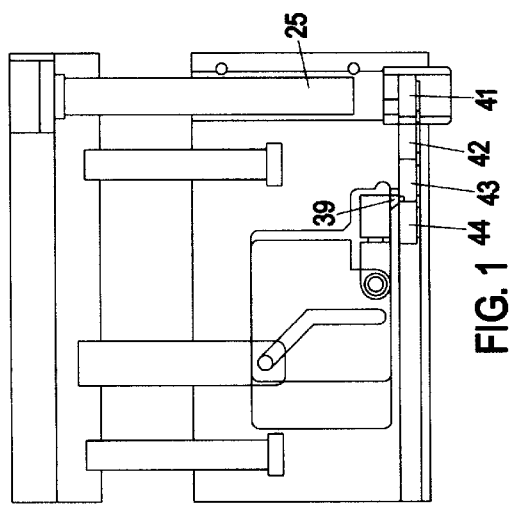
FIG. 1 is a diagrammatic side view of the tooling of the present invention attached to a press which is in a fully retracted position with a fastener in place for insertion.

The operation of the present invention is shown in FIGS. 1–6. FIG. 1 shows the press 50 fully retracted. A fastener 41 is positioned directly below anvil 25, having been urged into position by the movement of arm 39 of pawl 33 on the fasteners (42 and 43) in front of it. As the press moves down, as shown in FIG. 2, upper body 16 is collapsed against main body 15, compressing spring 17. The cam follower 37 of rod 34 follows slot 32, thereby moving cam 31 away from nest 26. This pulls pawl 33 back along track 35 and causes arm 39 to bend upward. When arm 39 moves behind the next fastener 44 on track 35, it pops down thereby holding this fastener 44 (and all those in front of it: 41, 42, and 43) in place.

Figure 3:
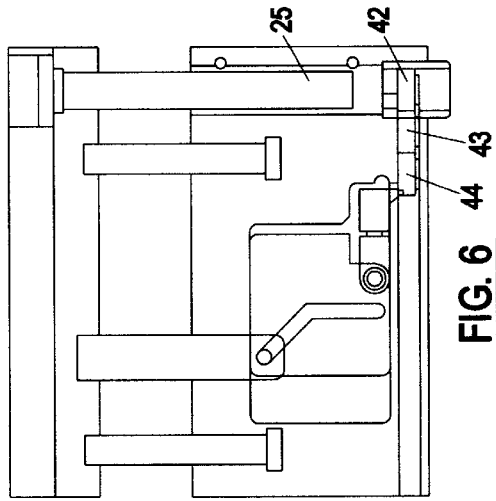
FIG. 3 is a diagrammatic side view of the tooling of the present invention attached to a press which is in a fully extended position, showing a fastener being inserted below the anvil.
Figure 5:
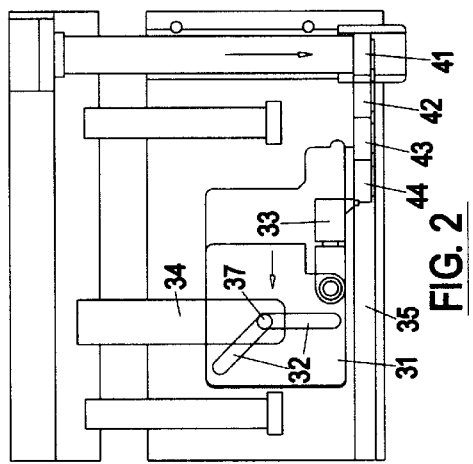
FIG. 5 is a diagrammatic side view of the tooling of the present invention attached to a press which is part way through an up stroke, showing the movement of another fastener partially into the nest below the anvil.

The press continues its down stroke and becomes fully extended as shown in FIG. 3. In the fully extended position shown in FIG. 3, spring 17 is fully compressed, and the length of anvil 25 is such that it extends to just below the lower surface of body 15. This causes pressure to be transmitted directly from the upper platen 55 of the press to fastener 41 through the damping material 20, washer 21, and anvil 25. Anvil 25 presses fastener 41 into a sheet of material below the main body (not shown) for insertion. Should the sheet of material 52 or any of the fasteners 41, etc. have an unexpected thickness, cushion 20 will absorb any excess pressure exerted by the press to dampen anvil 25 to prevent it from causing damage to the fastener, the part, the tooling or the die.

Figure 4:
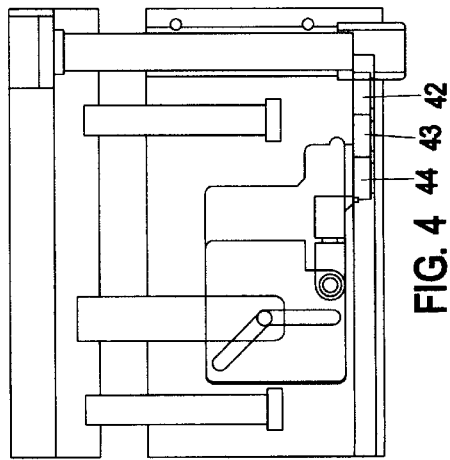
FIG. 4 is a diagrammatic side view of the tooling of the present invention attached to a press which is part way through an up stroke, showing the anvil moving to make the nest available for delivery of another fastener.

Then, press 50 begins to retract as shown in FIG. 4. There is no movement of cam 31 in FIGS. 3 or 4 because follower 37 is in the vertical part of slot 32. However, when the press retracts to the position shown in FIG. 5, the movement of cam 31 and pawl 33 causes arm 39 to again move toward nest 26. The fastener 42 enters nest 26 laterally at the open region adjacent to flanges 27. As this occurs, the two halves of nest 26 are moved slightly apart. The springs 28 on either side of the halves of nest 26 urge these halves together, thereby centering the fastener 42 for proper orientation while at the same time firmly holding it in place. When the press makes its down stroke as shown in FIG. 3, the two halves of nest 26 keep the fastener in proper orientation for insertion into the material below.

Figure 6:
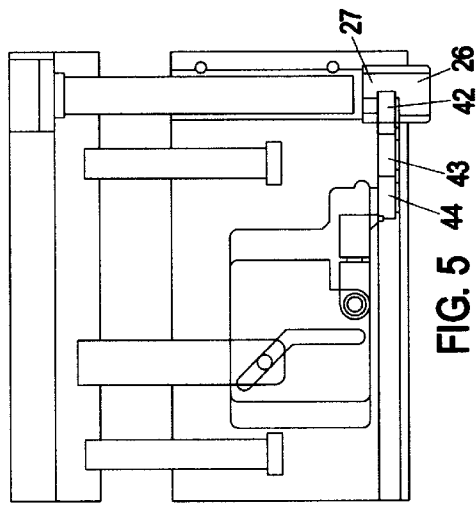
FIG. 6 is a diagrammatic side view of the tooling of the present invention attached to a press which is again in a fully retracted position with a new fastener in place for insertion.

FIG. 6 shows the next fastener 42 having been urged completely into nest 26, awaiting insertion as with fastener 41 in FIG. 1.

DESCRIPTION OF THE PREFERRED EMBODIMENTS

In the preferred embodiment, all of the parts of the tooling (the bodies 15 & 16, the cam 31, guides 18, track 35, nest 26, rod 34 and anvil 25) are made of strong, heat-resistant metal. The bodies are slender and compact to allow easy installation into a progressive die machine. Pressure trans- mission element 20 is made of a special urethane polymer material having a durometer (hardness) of between 80 and 95, shore A scale. Housing 19 should be easily removable to allow access to element 20 for removal and replacement.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A self-clinching fastener insertion module for use in a progressive die of a stamp press and for inserting fasteners into a sheet of material, comprising:

a first narrow body member having a top, bottom, opposite ends interconnecting the top and the bottom, and a first vertical bore at one end of said ends extending completely through said body member from the top to the bottom;

a horizontal track extending along said bottom and communicating with said bore;

an expandable annular bushing in said bore at a location where said track communicates with said bore, wherein the bushing is capable of receiving fasteners laterally from said track;

a slidable member mounted to said first body member above said track and having a spring-loaded arm extending into said track for urging the fasteners forward along said track and into said bushing;

a second narrow body member attachable to an upper platen of the stamp press, the second body member being slidably attached to said first body member and separated therefrom by a plurality of springs urging said body members apart from one another, and the second body member having a second vertical bore therein in axial alignment with said first vertical bore;

a removable anvil attached to said second body member, wherein the anvil includes a top portion and a shaft extending downwardly from the top portion into said first vertical bore; and a removable pressure transmission means, in said second vertical bore above said top portion of said anvil and in force transmitting relationship therewith, for dampening transmission of force from the upper platen to said anvil when thickness of the fasteners increases from one to another or when thickness of the sheet of material into which the fasteners are inserted increases from one portion to another.

2. The module described in claim 1 wherein said bushing comprises two arcuate halves urged together by a plurality of springs and defines a bore therethrough, said bore having an inside diameter that is larger than the outside diameter of said shaft so that said shaft may pass therethrough, said halves forming a semi-circular upper section for receiving fasteners from said track, and an annular lower section for holding said fasteners in a centered orientation below said shaft prior to insertion into the sheet of material.

3. The module described in claim 2, wherein said slidable member is mounted to said first body member and said anvil is attached to said second body member, such that as said second body member is moved away from said first body member said spring-loaded arm urges a fastener from said track into said upper portion of said bushing, and as said second body member is moved towards said first body member said shaft inserts the fastener from said bushing into the sheet of material.

4. The module described in claim 3 wherein said pressure transmission means is a block of urethane polymer material having a durometer of between 80 and 95, shore A scale.

5. The module described in claim 1 wherein a deformable tang is provided in said track behind said arm for preventing fasteners from sliding backward along the track away from the bushing.

6. A die member for inserting self-clinching fasteners into a sheet of material, comprising:

a. a first narrow body member having a top, bottom, opposite ends interconnecting the top and the bottom, and a first vertical bore at one end of said ends extending completely through said body member from the top to the bottom;

b. a horizontal track extending along said bottom and communicating with said bore;

c. an expandable annular bushing in said bore at a location where said track communicates with said bore, wherein the bushing is capable of receiving fasteners laterally from said track;

d. a slidable member mounted to said first body member above said track and having a spring-loaded arm extending into said track for urging the fasteners forward along said track and into said bushing;

e. a second narrow body member attached to a stamp press being slidably attached to said first body member and separated therefrom by a plurality of springs urging said body members apart from one another, and the second body member having a second vertical bore therein in axial alignment with said first vertical bore;

f. a removable anvil attached to said second body member, wherein the anvil includes a top portion and a shaft extending downwardly from the top portion into said first vertical bore; and g. a removable pressure transmission means, in said second vertical bore above said top portion of said anvil and in force transmitting relationship therewith, for dampening transmission of force from the stamp press to said anvil when thickness of the fasteners increases from one to another or when thickness of the sheet of material into which the fasteners are inserted increases from one portion to another.

7. The die member described in claim 6 wherein said pressure transmission means is a block of urethane polymer material having a durometer of between 80 and 95, shore A scale.

8. The die member described in claim 6 wherein a deformable tang is provided in said track for preventing fasteners from sliding backward along the track away from the bushing.

* * * * *